Sept. 8, 1959 P. MEYER 2,902,905
MACHINE FOR CUTTING MASTER CAMS
Filed Feb. 24, 1956 5 Sheets-Sheet 1
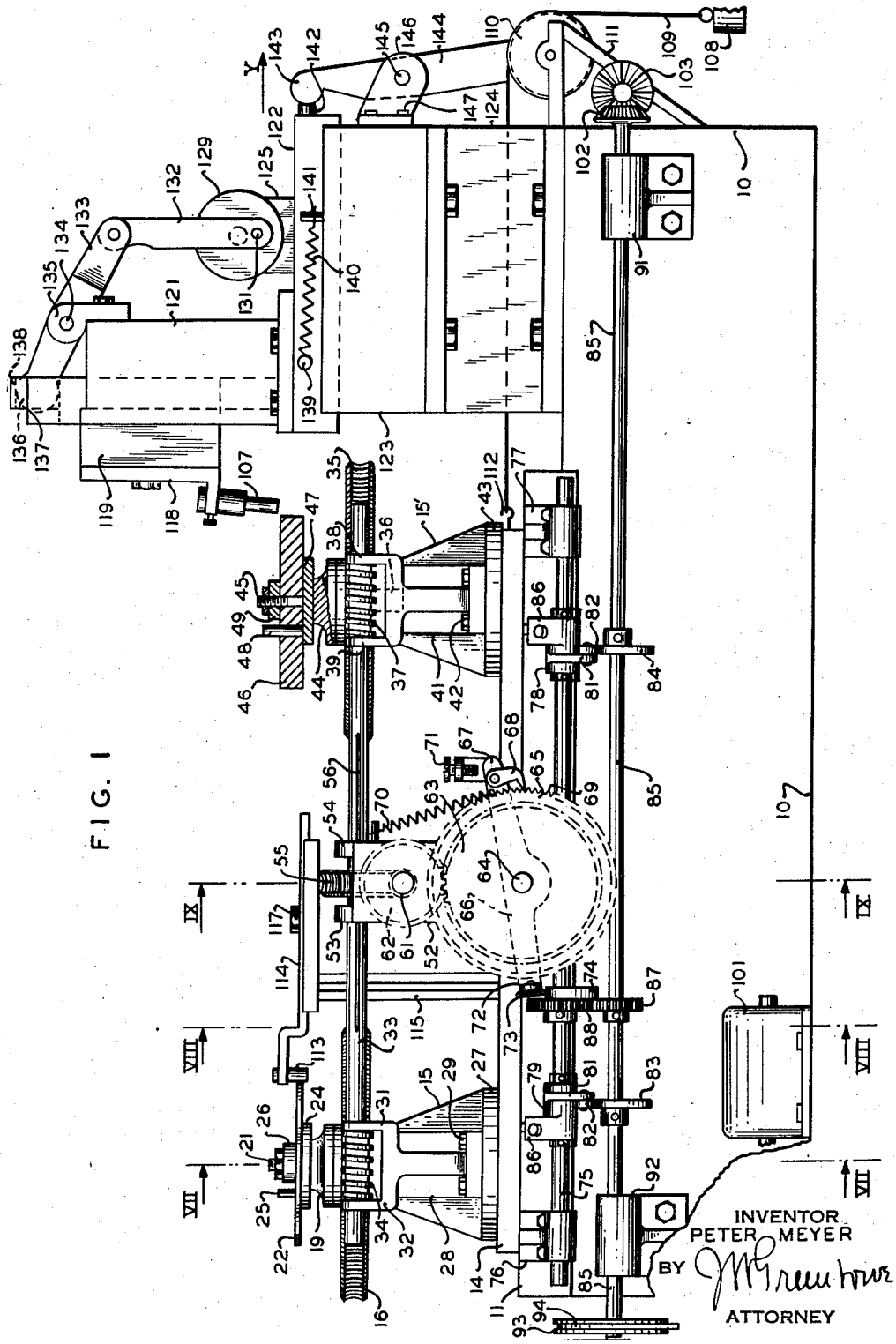
INVENTOR
PETER MEYER
BY
ATTORNEY

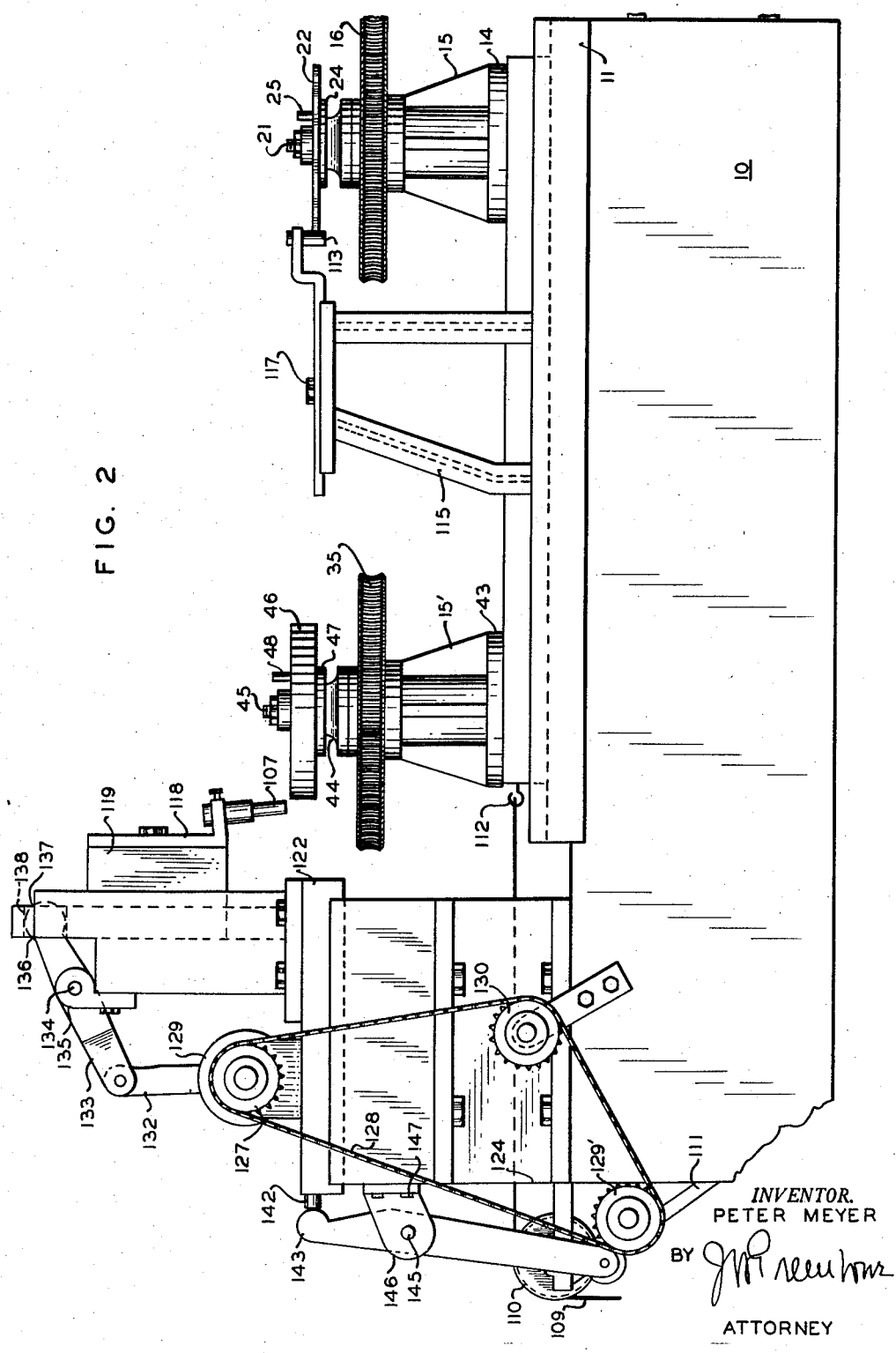

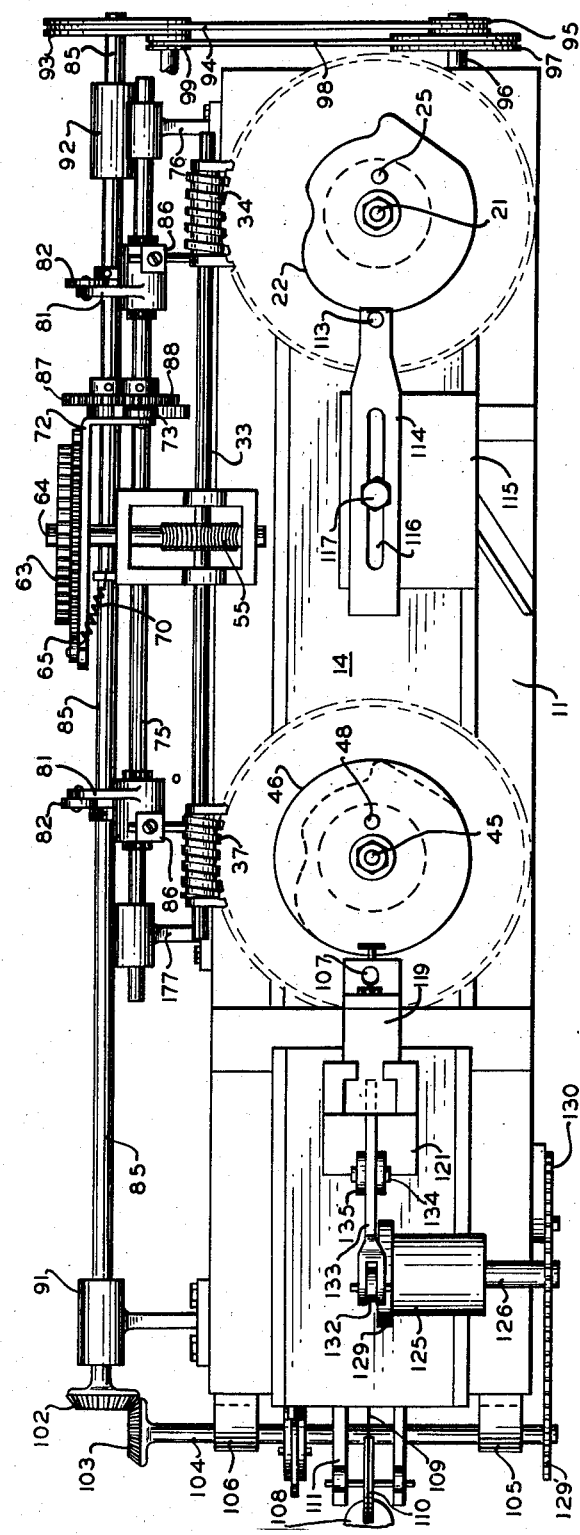

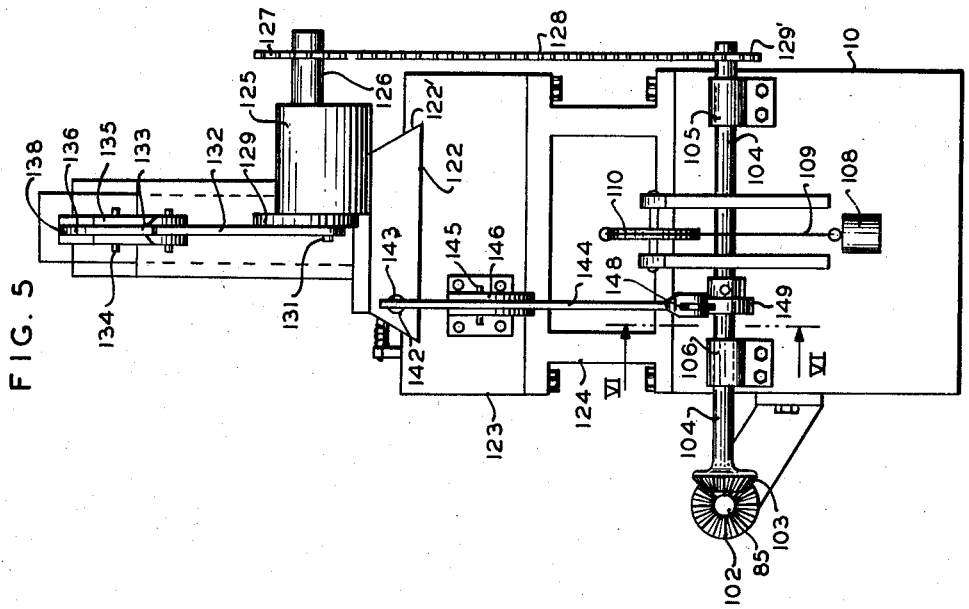

Sept. 8, 1959 P. MEYER 2,902,905
MACHINE FOR CUTTING MASTER CAMS
Filed Feb. 24, 1956 5 Sheets-Sheet 5
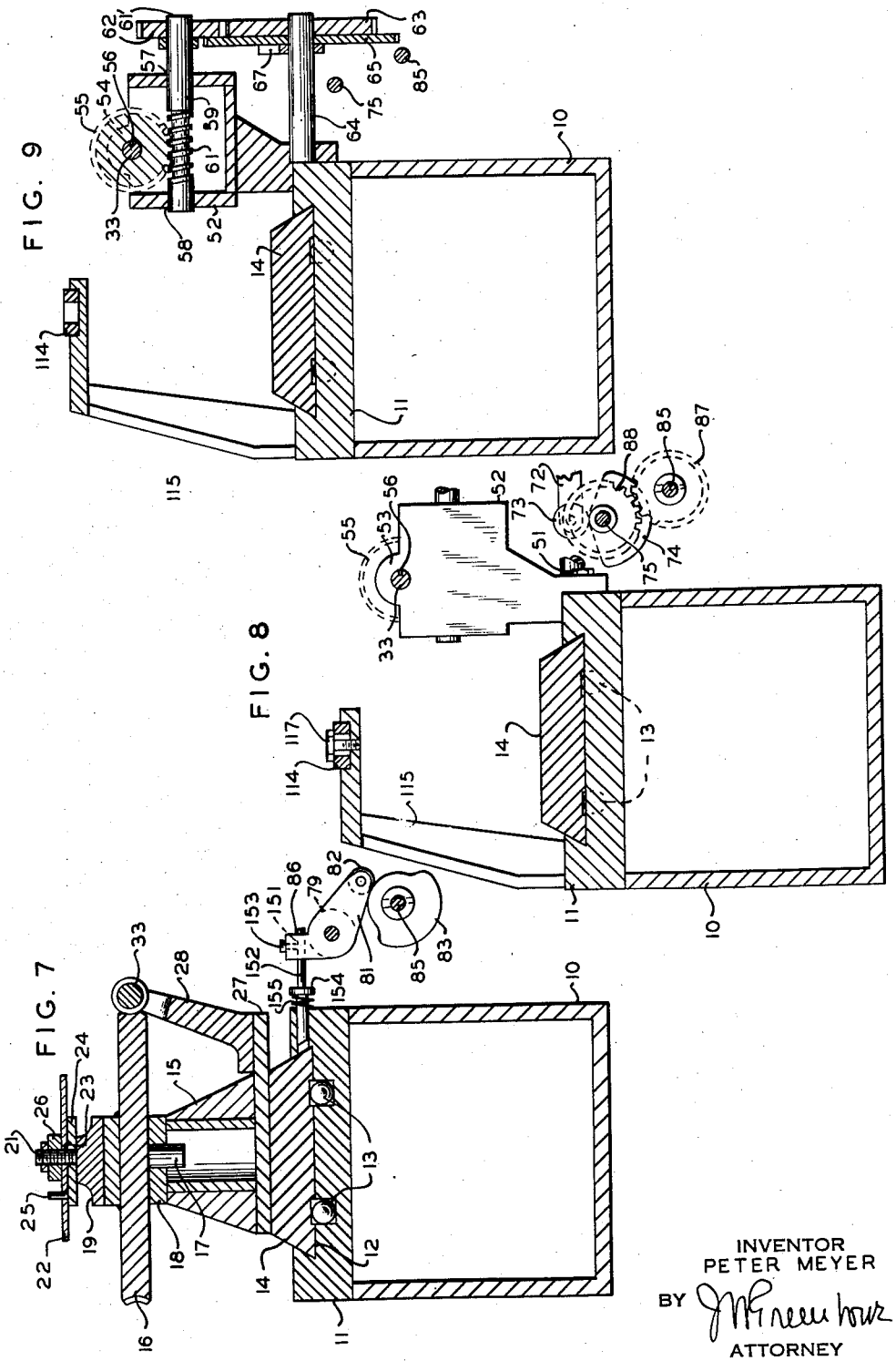
INVENTOR
PETER MEYER
BY [signature]
ATTORNEY United States Patent Office 2,902,905
Patented Sept. 8, 1959

2,902,905

MACHINE FOR CUTTING MASTER CAMS

Peter Meyer, Watchung, N.J.

Application February 24, 1956, Serial No. 567,679

6 Claims. (Cl. 90—24.3)

The present invention relates to cam cutting machines and relates more particularly to a machine for automatically cutting a master or pattern cam.

As is well known, the art of machine design which involves basic mechanical movements includes the use of cams of selected configuration to control the operation of other machine elements.

The configuration of the cam depends upon the variation in motion to be attained under the action of the cam follower during contact with the cam, which may be of the heart, jump, or other selected shape. Cams of this type vary in thickness and are produced in quantity from hard metal and, for the purpose of producing a number of cams of exact and similar dimensions, it is necessary to first provide what is known as a master or pattern cam.

The formation of a master or pattern cam of a selected design is an important operation in machine design and, since the master cam must resist the force applied by a guide member or follower during the cutting of the cam blank, the master cam must also be formed of hard metal to resist wear during repeated cam forming operations to avoid any change in the original pattern.

The configuration of the cam to be used for a given operation is, of course, predetermined and a pattern furnished to an operator. The formation of a pattern or master cam from a hard metal blank is a tedious and time-consuming operation, requiring careful and skilled performance by a competent workman with the result that the formation of a master cam is relatively expensive.

As will be hereinafter more specifically pointed out, the present machine makes possible the cutting of a pattern cam or master cam automatically from a cam blank, an operation which, as stated above, was heretofore performed by hand. This is accomplished by shaping what may be termed a primary pattern cam from a sheet or plate of readily workable material as, for example, a composition such as "Bakelite" or the like, which may be easily cut with a hand tool and shaped from a pattern to provide the design of cam to be produced. As stated above, the master cam as now employed must be of hard metal to resist force exerted by a cam follower during the formation of the cam being formed by the usual milling cutter. A machine of this type is shown and described in my co-pending application, Ser. No. 528,273, filed August 15, 1955, now Patent No. 2,872,852.

When a primary pattern cam of relatively soft material is employed, the operation of the cam follower as previously employed would result in the application of too great a pressure on the soft material. It is necessary, therefore, to avoid the continuous pressure contacting relation between the cam follower and the primary pattern cam. In the present machine the primary pattern cam and a cam follower are held in relatively light but positive contacting relation.

Heretofore it has been the practice to hold the cam blank in continuous firm contact with a cutting tool in the form of a rotating or milling cutter. In the present machine the cutting operation is performed by a reciprocating cutting tool which is normally held above and in spaced relation to the surface to be operated upon. It has also been the practice to rotate the pattern cam and the cam blank continuously. In the present machine the primary pattern cam and the cam blank are rotated intermittently and the cam cutting operation is performed during a stationary period between each intermittent movement.

An object of the present invention is, therefore, to provide a machine whereby what may be termed a primary pattern cam of relatively soft, readily workable, material may be employed for use in the automatic formation of a master cam of relatively hard material such as metal.

Another object of the invention is to provide a machine for the cutting of a master cam from a metal blank by a reciprocating cutting tool.

Another object of the invention is to provide a machine whereby a cam cutting operation is performed during intermittent rotary movement of a cam blank.

In a machine as constructed in accordance with the present invention, a primary cam is supported horizontally for rotation in spaced relation to a cam blank supported horizontally for rotation in unison with the primary cam, the axes of the primary cam and cam blank being disposed in parallel relation.

A cutting tool is provided for reciprocation vertically for engaging the edge of the cam blank for a cutting operation. The primary cam and the cam blank are each supported on a common slide member. Adjacent to the slide member is a guide member or cam follower held in contact with an edge of the primary cam. Means are employed to rotate to the primary cam and the cam blank intermittently and after each movement, the cutting tool is operated to remove material from the cam blank. Inasmuch as the primary pattern cam is of relatively soft material, the contact between the primary cam and cam follower must be relatively light to avoid deformation or wear. The movement of the primary cam and the cam blank occurs only when the cutting tool is free, and when the cutting tool operates, the primary cam is held fixed. Thus, the primary cam and cam blank move only a relatively short distance and are held fixed during the actuation of the cutting tool. This operation is repeated for each increment of movement.

Fig. 1 is an elevational view of one side of a machine for the automatic cutting of master cams in accordance with the present invention;

Fig. 2 is an elevational view of an opposite side of the machine;

Fig. 3 is a top plan view of the machine;

Fig. 4 is an elevational view of the left end of the machine shown in Fig. 1;

Fig. 5 is an elevational view of the right end of the machine shown in Fig. 1;

Fig. 6 is a fragmentary view showing the neutral position of one of the lever members with relation to a cam;

Fig. 7 is a view taken on line VII—VII in Fig. 1, viewed in the direction indicated by the arrow;

Fig. 8 is a view taken on line VIII—VIII in Fig. 1, viewed in the direction indicated by the arrow, and;

Fig. 9 is a view taken on line IX—IX in Fig. 1, viewed in the direction indicated by the arrow.

A practical embodiment of the machine includes a frame 10 for supporting an elongated base plate 11 (see Fig. 7) having a V-slot longitudinally thereof provided with ball races 13 on which a V-guide or slidable support member 14 is freely movable to serve as a carriage or platen to movably support other operating mechanism to be described.

Mounted on and suitably secured to opposite ends of the carriage 14 are supporting brackets 15 and 15' (see Figs. 1 and 7). On bracket 15, located at one end of carriage 14, is mounted a worm-wheel 16 having a stub shaft 17 journaled in a bearing 18 integral with bracket 15. The worm-wheel 16 is provided with a hub 19 from which extends a threaded shaft 21 to receive a primary master or pattern cam 22. The primary cam has a central aperture 23 to receive shaft 21 and seats on a plate 24 which is provided with a locating pin 25 for disposition in an aperture provided in the primary cam. Lock nuts 26 are provided to cooperate with the threads of shaft 21 to secure the primary cam against movement relative to the bracket 15.

The bracket 15 is provided with an extended ledge 27 to support a bearing bracket 28 which is secured at one end to the ledge 27 by tap bolts 29. The other end of the bracket 28 is bifurcated to provide bearing hubs 31 and 32 for a rotatable secondary driving shaft 33. Mounted on shaft 33 intermediate hubs 31 and 32 is a worm 34 in mesh with worm-wheel 16.

The bracket 15' mounted at the other end of the carriage supports a worm-wheel 35 of the same pitch as worm-wheel 16 and rotatable on a stub shaft 36 journaled in bracket 15'. The worm-wheel 35, like worm-wheel 16, is in mesh with a worm 37 secured to and rotatable with shaft 33 which, as stated, is secured to worm 34. The worm 37 is disposed intermediate bearing hubs 38 and 39 in which shaft 33 is journaled. The said hubs are integral with a bracket member 41 secured by tap bolts 42 to an extended portion 43 of bracket 15'. The worm-wheel 35 is provided with a hub 44 from which extends a threaded shaft 45 for insertion through a central aperture of a cam blank 46 which rests on a plate 47 and is provided with a locating pin 48 for disposition in an aperture provided in the cam blank 46. When the cam blank is in place, it is secured in fixed relation to the hub 44 of worm-wheel 35 by means of lock nut 49.

As stated, the shaft 33 which rotates worms 34 and 37 extends between the brackets 15 and 15' which are secured to opposite ends of carriage 14.

Intermediate the brackets 15 and 15' (see Figs. 1, 8, and 9) and secured by tap bolts 51 to base plate 11 of frame 10 is a bearing bracket 52 having bearing hubs 53 and 54 in which shaft 33 is also journaled. Mounted on shaft 33 between bearings 53 and 54 is a worm-wheel 55 by means of which shaft 33 is rotated to cause the simultaneous rotation of the pattern and cam blank. As stated, the supporting brackets for the pattern and cam blank are mounted on and are movable with carriage 14. The worm-wheel 55, although in fixed position, is provided with a key disposed in slot or key-way 56 extending longitudinally of the shaft to permit endwise movement of the shaft relative to worm-wheel 55 during rotation thereof to drive worms 34 and 37.

The bearing bracket 52 is provided with bearings 57 and 58 (see Fig. 9) in which is journaled a shaft 59 of a worm 61 in mesh with worm-wheel 55. At one end 61' of shaft 59 is secured a spur gear 62 in mesh with a spur gear 63 mounted at one end of a shaft 64 and rotatable thereon. The other end of shaft 64 is secured to frame 10. Also mounted on shaft 64 for rotation thereon and secured to spur gear 63, is a ratchet wheel 65 of greater diameter than gear 63. Adjacent to ratchet wheel 65 and loosely mounted on shaft 64 is a straight double arm lever member 66 having at one end 67 a pawl 68 for engaging teeth 69 of ratchet wheel 65. An adjustable stop member is provided in the form of a set screw 71 to limit the movement of end 67 of the lever in one direction.

The opposite end 72 of lever 66 is provided with a roller 73 for engagement with a cam 74 secured to a counter shaft 75 journaled in bearings 76 and 77 secured to frame 10. A spring 70 secured at one end to an end of lever member 66 and to bracket 52 serves to normally hold roller 73 in contact with cam 74. The counter shaft 75 is also provided with hubs 78 and 79, each of which is provided with an arm 81 having a roller 82 in contact with cam members 83 and 84 secured to a driving shaft 85. The hubs or collars 78 and 79 are free to rotate about shaft 75 and are each provided with an arm 86, the purpose of which will be hereinafter described.

Secured to shaft 85 is a gear wheel 87 in mesh with a gear wheel 88 disposed adjacent to cam 74 and secured to shaft 75 whereby counter shaft 75 is rotated upon a rotation of drive shaft 85. Driving shaft 85 is journaled in bearings 91 and 92 secured to frame 10. At one end of shaft 85 is a pulley 93 connected by belt 94 to a pulley 95 rotatable on stub shaft 96 (see Fig. 4) extending from frame 10. Shaft 96 is also provided with a pulley 97 connected by belt 98 to pulley 99 on shaft of a motor 101. The diameters of the intermediate pulleys for translating motion to shaft 85 are so proportioned as to rotate the shaft at a selected speed.

The other end of shaft 85 is provided with a bevel gear 102 in mesh with bevel gear 103 at one end of a secondary driving shaft 104 journaled in bearings 105 and 106 secured to frame 10. The shaft 104 controls the operation of a cutting tool 107 (see Fig. 1) when the cam blank 46 is to be shaped in accordance with the pattern cam 22.

As hereinabove pointed out, the carriage 14 is slidable, and moves the supports 15 and 15' for the primary cam and cam blank as a unit. The carriage is moved normally in one direction by means of a weight 108 secured to one end of a cable 109 passing over a pulley 110 mounted in bearings on a bracket 111 secured to frame 10. The other end of the cable is secured to a hook 112 fastened to an end of carriage 14. Thus, the pattern cam 22 is moved into contact with a follower or guide member 113 in the form of a cylindrical member secured at one end of a side bar 114 disposed on the surface of a support 115 secured to frame 10 and at one side of the carriage 14. The slide bar is provided with a slot 116 in which a set screw 117 is disposed, whereby the slide bar may be adjusted and secured with member 113 in contact with the edge of the pattern cam 22, the weight 108 acting to move the carriage to maintain the contact.

When the guide member 113 is in contact with the edge of the pattern cam 22, the cam blank 46 is in position to be operated upon by the cutting tool 107 which is in cutting position adjacent to and above the edge of the cam blank 46.

As stated, the present machine operates to cut the blank by a movement of the tool in a path substantially parallel to the axis of rotation of the cam blank. The operation of the tool is, however, so controlled as to make a cut after each intermittent movement of the cam blank. The tool 107 is adjustably secured at one end of a tool holder 118 on a vertical slide member 119 movable in a groove of a housing 121. This housing is mounted on a V-slide 122 movable in a slot 122' in the upper surface of a base member 123 which, in turn, is mounted on a bridge member 124 secured to frame 10 (see Figs. 1 and 5).

At one end of the V-slide 122 is secured a bearing block 125 in which is journaled a shaft 126. Secured to one end of shaft 126 is a sprocket wheel 127. A chain 128 engaging the idler sprocket 130 connects sprocket 127 with sprocket wheel 129' secured to an end of secondary driving shaft 104 which is driven by drive shaft 85 through meshing bevel gears 102 and 103.

The other end of shaft 126 has secured thereto a disk 129 having a wrist pin 131 pivoted to one end of a connecting rod 132 to provide reciprocating movement. The rod 132 is pivotally connected at its opposite end to one end of a rocker or lever member 133, fulcrumed on pin 134 journaled in bearings 135 integral with housing 121.

An end 136 of lever member 133 is provided with a circular head 137 disposed within and in contacting relation with the surfaces of a slot 138 at one end of vertical slide member 119. Upper and lower surfaces of slot 138 serve to engage head 137 to actuate tool 107. Thus, an oscillation of the head 137 results in a reciprocal movement of the slide member 119 and an operation of cutting tool 107 when positioned to engage the edge of cam blank 46 by what may be termed a cutting tool actuating mechanism mounted on the slide member 122.

The cutting tool actuating mechanism, as pointed out, is driven by shaft 104 through sprocket 129′, chain 128, and sprocket 127. The movement of the cutting tool into operative and inoperative relation with the cam blank is controlled by means including a tension member 140 in the form of a helical spring having one end attached to a pin 139 secured to slide member 122 and the other end secured to a pin 141 fastened to base member 123. The slide 122 is, therefore, urged in the direction as indicated by arrow Y (Fig. 1) to normally bring the tool 107 out of operative relation with the edge of cam blank 46.

When the slide 122 is in its normal or retracted position an end contact member 142 is engaged with an arcuate surface of an end 143 of a lever 144. This lever is arranged to rock about a pin 145 secured in a bracket 146 fastened to base member 123 by tap bolts 147. The other end of the lever 144 is provided with a roller 148 (see Fig. 5) disposed in contact with a cam member 149 secured to shaft 104. As will be evident, the movement of the slide member 122 under the action of spring 140 causes the lever 144 to be rocked about its pivot and the roller 148 is maintained in contact with the cam 149.

The roller 148 and cam 149 are shown more clearly in Fig. 6. The cam 149 is so formed and arranged that it actuates the lever 144, after each intermittent movement of the cam blank to move the tool 107 in position to make a cut for the removal of material from the edge of the cam blank.

As stated above, the cutting operation is performed after each movement of the primary cam and cam blank during which cutting period the primary cam and the cam blank are locked against movement as would occur otherwise when the tool is driven into cutting relation with the cam blank.

In order to hold the primary cam and the cam blank in fixed positions, the counter shaft 75, as hereinabove pointed out, is equipped with collars 78 and 79. Each of the collars has an arm 86 and, since they are of similar construction and operation, a description of one will answer for both. Referring to Fig. 7, it will be noted that arm 86 is provided with a bore 151 in which a member herein termed a locking-bar 152, is secured at one end by a set screw 153. The other end of the locking bar 152 extends through a passage in base plate 11 and is beveled to make contact with beveled surface of the slidable support member 14. A collar 154 is provided on the lock-bar 152 in fixed spaced relation to base plate 11. Helical spring 155 normally holds the locking bar 152 out of contact with the slide member 14 and moves the arms 81 to maintain rollers 82 in contact with cams 83 and 84 which are rotated by shaft 85. When the cams 83 and 84 are moved from the drop surfaces to the cam rise surfaces (exaggerated for clarity in Fig. 7), the arms 86 are then actuated to move the locking bar 152 and the carriage 14 is held stationary during the downward movement of the cutting tool 107 to remove material from the lateral surface of the master cam 46. A further rotation of cams 83 and 84 releases the carriage 14.

*Operation*

As shown and described, a primary pattern cam 22 of relatively soft material is placed on support 15 and secured against relative movement. The cam blank 46 is placed on support 15′ and secured against relative movement.

When the motor 101 operates to rotate driving shaft 85, motion is translated to counter shaft 75 by means of gears 87 and 88. The cam 74 is thus rotated and lever 66 is actuated to cause pawl 68 to engage and move ratchet wheel 65 a selected degree. The gear wheel 63 in mesh with gear 62 causes a movement of the worm 61 to rotate worm wheel 55 to rotate the secondary driving shaft 33. A rotation of shaft 33 causes worms 34 and 37 to rotate worm wheels 16 and 35 respectively, thereby rotating the primary pattern cam and the cam blank in unison.

When the primary pattern cam and the cam blank have been rotated, the cams 83 and 84 operate to cause locking bars 152 to engage and hold the carriage stationary for the operation of the cutting tool 107.

The driving shaft 85 being geared to shaft 104 causes a rotation of cam 149. This cam, being engaged at its drop surface, with roller 148, the V-slide 122 is in position to hold the tool 107 in adjacent spaced relation to the edge of cam blank 46. As the shaft 104 rotates, the cam 149 lifts the roller 148 at the end of lever 144. The other end of the lever 144 serves to move the tool 107 into operating relation with the edge of the cam blank 46. When the tool is in operating position, the shaft 126 which is connected to shaft 104 by chain belt 128, moves the wristpin 131 to actuate rocker member 133. The vertical slide member is then actuated to cause the tool to cut material from the edge of cam blank.

As will be evident, the tool 107 reciprocates in a selected vertical path so that each cutting operation removes the same amount of material. The position of the edge of the cam blank with respect to the tool is controlled by the contacting relation between the primary pattern cam and the fixed cam follower 113. In the present machine where the cut is vertical, the removal of the tool leaves the blank free to be rotated for the next cutting operation.

After a cut has been made a movement of the wristpin 131 causes the tool to be lifted and cam 149 is moved to permit spring 140 to return the V-slide 122. The lock bars are retracted and cam 74 actuates lever 66 to cause pawl 68 to engage a tooth on ratchet wheel 65 and thereby rotate the primary cam and the cam blank for another cutting operation. The degree of rotation of the cams after each cutting operation is extremely small and may be regulated in accordance with good practice by a variation in the degree of movement controlled by the ratchet and pawl intermittent driving mechanism.

As will be understood from the foregoing, and as is the general practice, the operation of cutting a cam is performed at a relatively slow rate of speed. The present machine employs speed reduction means in the form of the pulleys and belts as shown to translate motion from the motor to the main driving shaft. A selected speed of rotation for the cams to meet different conditions, may be had by modification of the speed control means.

The time required for the formation of a cam duplicating the primary cam depends on the thickness and diameter of the cam being formed. In practice it has been found that a cam one inch in thickness and eight inches in diameter may be formed in about thirty minutes. In some cases it may be necessary to rough out a cam and finally finish in another operation.

The stationary periods, during which the cutting operation is performed, may be varied as good practice dictates by modification of the means employed to cause the intermittent rotary movement of the cams.

As above explained, in the present machine the cams are held fixed during each stationary period. Thus, when force is applied during the cutting operation, the primary cam which is of soft material, is not subjected to pressure which would otherwise be imposed by the cam follower as in the practice where the pattern cam engages the cam follower and serves to hold the cam blank against lateral movement during the cam cutting operation. The present invention, as above explained, makes practical the use of a reciprocating cutting tool and provides a uniform working surface for the finished cam.

It will be evident that by means of the above described mechanism the laborious operation of cutting a master cam from a hard metal blank is no longer necessary. With the present machine it is now possible and commercially practical to employ what is herein termed a primary pattern cam readily formed of soft easily workable material for use in automatically machining a working pattern cam of a hard metal as required in the making of final cams which become operating elements of various types of machines.

Although a preferred embodiment of the invention is shown and described herein, it is to be understood that modifications may be made therein without departing from the spirit and scope of the invention as set forth in the appended claims.

What is claimed is:

1. An automatic master cam cutting machine, comprising a movable carriage, a cam support mounted at one end of said carriage, a primary cam of soft material on said cam support, a cam blank support mounted at the other end of said carriage, said cam blank support adapted to support a cam blank, each of said supports being provided with a worm-wheel rotatable therewith, a secondary drive shaft, a pair of worms on said secondary shaft disposed in engagement with said worm wheels, a main driving shaft, means actuated by said main driving shaft to cause intermittent rotation of said secondary shaft to rotate said primary cam and said cam blank and to hold said primary cam and cam blank stationary after each rotary movement, a cam follower disposed in contact with said primary cam, a cutting tool disposed adjacent to said cam blank in a relation to the axis of rotation of said cam blank corresponding to the relation of the cam follower to the axis of rotation of its primary cam, a movable support for said cutting tool and for locating said tool in the aforesaid relation, means for moving said carriage to maintain said cam follower in contact with said primary cam, means for locking said carriage against movement during stationary periods of said primary cam and cam blank, means for moving said cutting tool into cutting relation to said cam blank and means for actuating said tool to remove material from said cam blank during said stationary periods.

2. An automatic master cam cutting machine, comprising a movable carriage, a cam support mounted at one end of said carriage, a primary cam of soft material on said cam support, a cam blank support mounted at the other end of said carriage, said cam blank support adapted to support a cam blank, each of said supports being provided with a worm-wheel rotatable therewith, a secondary drive shaft, a pair of worms on said secondary shaft disposed in engagement with said worm wheels, a main driving shaft, ratchet means actuated by said main driving shaft to cause intermittent rotation of said secondary shaft to rotate said primary cam and said cam blank and to hold said primary cam and cam blank stationary after each rotary movement, a cam follower disposed in contact with said primary cam, a cutting tool disposed adjacent to said cam blank in a relation to the axis of rotation of said cam blank corresponding to the relation of the cam follower to the axis of rotation of its primary cam, a movable support for said cutting tool and for locating said tool in the aforesaid relation, means for moving said carriage to maintain said cam follower in contact with said primary cam, means actuated by said main driving shaft for locking said carriage against movement during stationary periods of said primary cam and cam blank, means for moving said cutting tool into cutting relation to said cam blank and means for actuating said tool to remove material from said cam blank during said stationary periods.

3. An automatic master cam cutting machine, comprising a movable carriage, a cam support mounted at one end of said carriage, a primary cam of soft material on said cam support, a cam blank support mounted at the other end of said carriage, said cam blank support adapted to support a cam blank, each of said supports being provided with a worm-wheel rotatable therewith, a secondary drive shaft, a pair of worms on said secondary shaft disposed in engagement with said worm-wheels, a main driving shaft, pawl and ratchet means actuated by said main driving shaft to cause intermittent rotation of said secondary shaft to rotate said primary cam and said cam blank and to hold said primary cam and cam blank stationary after each rotary movement, a cam follower disposed in contact with said primary cam, a cutting tool disposed adjacent to said cam blank in a relation to the axis of rotation of said cam blank corresponding to the relation of the cam follower to the axis of rotation of its primary cam, a movable support for said cutting tool and for locating said tool in the aforesaid relation, means for moving said carriage to maintain said cam follower in contact with said primary cam, means for locking said carriage against movement during stationary periods of said primary cam and cam blank, means for moving said cutting tool into cutting relation to said cam blank and means for actuating said tool to remove material from said cam blank during said stationary periods.

4. An automatic master cam cutting machine, comprising a movable carriage, a primary cam support mounted at one end of said carriage, a cam blank support mounted at the other end of said carriage, each of said supports being provided with a worm-wheel rotatable therewith, a secondary drive shaft, a pair of worms on said secondary shaft disposed in engagement with said worm-wheels, a main driving shaft, pawl and ratchet means actuated by said main driving shaft to cause intermittent rotation of said secondary shaft to rotate said primary cam and said cam blank and to hold said primary cam and cam blank stationary after each rotary movement, a cam follower disposed in contact with said primary cam, a cutting tool disposed adjacent to said cam blank in a relation to the axis of rotation of said cam blank corresponding to the relation of the cam follower to the axis of rotation of its primary cam, a movable support for said cutting tool and for locating said tool in the aforesaid relation, means for moving said carriage to maintain said cam follower in contact with said primary cam, a locking-bar for holding said carriage against movement during stationary periods of said primary cam and cam blank, means actuated by said main driving shaft for actuating said locking-bar, means for moving said cutting tool into cutting relation to said cam blank and means for actuating said tool to remove material from said cam blank during said stationary periods.

5. A machine for cutting a master cam, comprising a support for a primary pattern cam of relatively soft material, a support for a cam blank, means for rotating said supports synchronously, a carriage for said supports, a cam follower, means for supporting said cam follower adjacent to said cam blank, a cutting tool adapted to travel in a reciprocating orbit and make a cut parallel to the axis of rotation of the cam blank, said tool having an orbit of reciprocation along a path of cutting stroke and along a different path of return stroke with the tool withdrawn from contact from the cam blank on said return stroke, tool-mounting means comprising a housing moveable toward and from the axis of rotation of the cam blank and a slide member on said housing moveable in a direction longitudinally parallel to said axis, means for moving said carriage to move said supports to engage a surface of said primary pattern cam with said cam follower and to position said cam blank in operative relation to said path of cutting stroke of the cutting tool, and means for reciprocating said cutting tool while maintained in said path of cutting stroke toward said cam blank for the removal of material from said cam blank and for returning said cutting tool along said different path of return stroke retracted from said cam blank.

6. A machine for cutting a master cam, comprising a support for a primary pattern cam of relatively soft material, a support for a cam blank, means for rotating said supports synchronously, a carriage for said supports, a cam follower, means supporting said cam follower adjacent to said cam blank, a cutting tool adapted to travel in a reciprocating orbit and make a cut parallel to the axis of rotation of the cam blank, said tool having an orbit of reciprocation along a path of cutting stroke and along a different path of return stroke with the tool withdrawn from contact from the cam blank on said return stroke, tool-mounting means comprising a housing moveable toward and from the axis of rotation of the cam blank and a slide member on said housing moveable in a direction longitudinally parallel to said axis, means for moving said carriage to move said supports to cause a surface of said primary cam and said follower to be in engagement and to position said cam blank in operative relation to said path of cutting stroke of the cutting tool, means for reciprocating said cutting tool while maintained in said path of cutting stroke toward said cam and for returning said cutting tool along said different path of return stroke in retracted relation from said cam blank, locking means engaging and holding said carriage against relative movement during the cutting stroke of said cutting tool, and interconnected means between said housing and locking means for moving the housing to locate the tool in said cutting path and to lock the carriage simultaneously.

References Cited in the file of this patent

UNITED STATES PATENTS

| | | |
|---|---|---|
| 1,197,088 | Winkley | Sept. 5, 1916 |
| 1,295,286 | Dunbar | Feb. 25, 1919 |
| 1,306,266 | Luster | June 10, 1919 |
| 1,881,794 | Marsilius | Oct. 11, 1932 |
| 2,388,555 | Kuehni et al. | Nov. 6, 1945 |
| 2,445,971 | Rosen | July 27, 1948 |
| 2,548,180 | Vassakos | Apr. 10, 1951 |
| 2,552,767 | Breisch | May 15, 1951 |